Nov. 30, 1948.    L. DE MARCO    2,454,914
SPEED CONTROL MECHANISM
Filed Nov. 23, 1945    3 Sheets-Sheet 1

INVENTOR.
LOUIS DeMARCO
BY Kerr, Hudson, Boughton & Williams
ATTORNEYS

Nov. 30, 1948.    L. DE MARCO    2,454,914
SPEED CONTROL MECHANISM

Filed Nov. 23, 1945    3 Sheets-Sheet 2

INVENTOR.
LOUIS DeMARCO
BY
Kwis Hudson Boughton & Williams
ATTORNEYS

Nov. 30, 1948.  L. DE MARCO  2,454,914
SPEED CONTROL MECHANISM
Filed Nov. 23, 1945  3 Sheets-Sheet 3

INVENTOR.
BY LOUIS DEMARCO
Kwis Hudson, Boughton & Williams
ATTORNEYS

Patented Nov. 30, 1948

2,454,914

UNITED STATES PATENT OFFICE 2,454,914

SPEED CONTROL MECHANISM

Louis De Marco, Cleveland, Ohio

Application November 23, 1945, Serial No. 630,360

15 Claims. (Cl. 264—3)

This invention relates to improvements in speed control mechanisms for internal combustion engines, and other engines such as steam engines including turbines, as well as helicopters and other mechanisms, and has to do with means for rendering the governor control more sensitive at a selected critical speed than elsewhere in the speed range.

One of the objects of the invention is the provision of throttle mechanism which shall be highly sensitive to speed fluctuations at and near a predetermined critical speed, and normally sensitive at other speeds.

Another object is the provision, in mechanism of this character, of means for manually selecting the critical speed.

Other objects and features of novelty will appear as I proceed with the description of those embodiments of the invention which, for the purposes of the present application, I have illustrated in the accompanying drawings, in which Fig. 1 is a side elevational view, partly in section on the line 1—1 of Fig. 2, of control mechanism embodying the invention, intended for use upon Diesel engines of the vehicle type.

Figure 9:
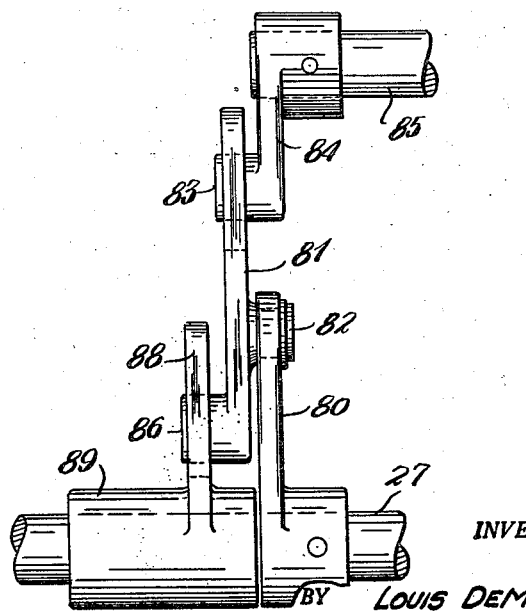

Figs. 5, 6, 7, and 8, are diagrammatic views of a modified form of the invention illustrating the positions of the parts for different speed settings, and Fig. 9 is a side elevational view of the mechanism of the latter modification.

In the drawings there is shown at 10 the housing of a governor mechanism for an internal combustion engine. The governor comprises a shaft 11 with a projecting portion adapted to be operatively connected with the internal combustion engine. Shaft 11 is mounted in bearings 12 and 13. It carries a bracket 14 held against relative rotation by a pin 15 and having pivots 16 upon which are mounted arms 17 carrying centrifugal weights 18, the weights 18 having bearing surfaces 19 which engage rollers 20 on a slide 21 that is provided with ears 22 which straddle the arms 17 and impart rotation thereto. As the speed of rotation increases the bearing surfaces 19 press against rollers 20 and force slide 21 to the right, as viewed in Fig. 2. This pressure is transmitted to a ball bearing 23 which bears against a socket collar 24 that receives one end of a coil spring 25, the opposite end of which engages against an abutment plate 26.

In the housing 10 there is mounted a transverse rock shaft 27 to which is fixed a yoke 28 that carries pins or rollers 29 which run in a groove 30 in the collar 24. Obviously, as the collar 24 moves along the shaft 11 because of pressure exerted by the slide 21 or return pressure exerted by the spring 25, the shaft 27 will oscillate back and forth. The governor construction per se forms no part of the present invention. A similar construction is fully described and claimed in my copending application Serial No. 592,119 filed May 5, 1945.

Transverse shaft 27 projects forwardly from the housing, as viewed in the drawings and extends through a supplemental housing or casing 9 which serves primarily to protect the parts against moisture, dust and other foreign matter. Within casing 9 a cam 31 is mounted to turn freely about the axis of the shaft. Provision is made for the setting of this cam in different angular positions, its throw being limited by a slot 32 in the cam receiving a machine screw 33 that is threaded into the housing 10.

Figure 1:
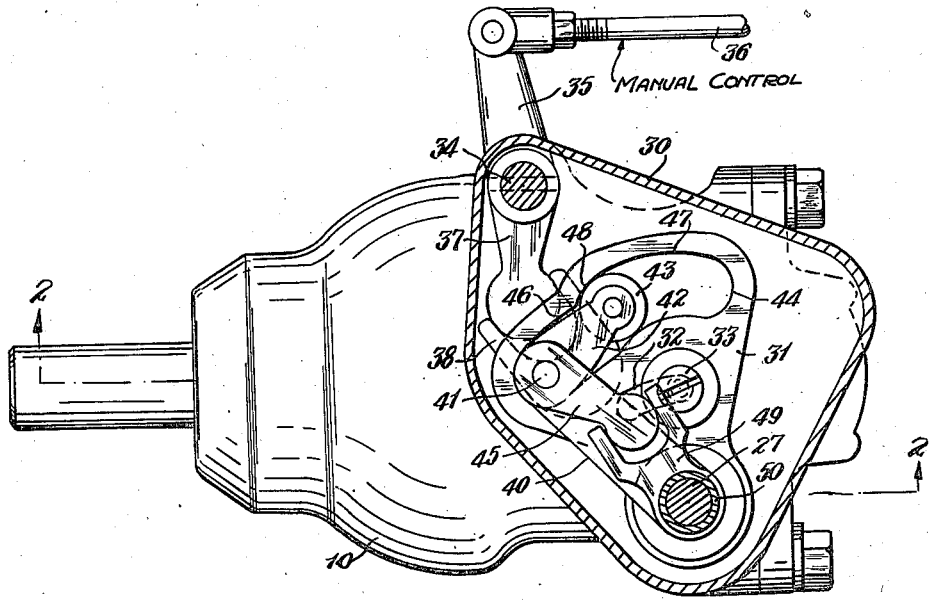
Figure 2:
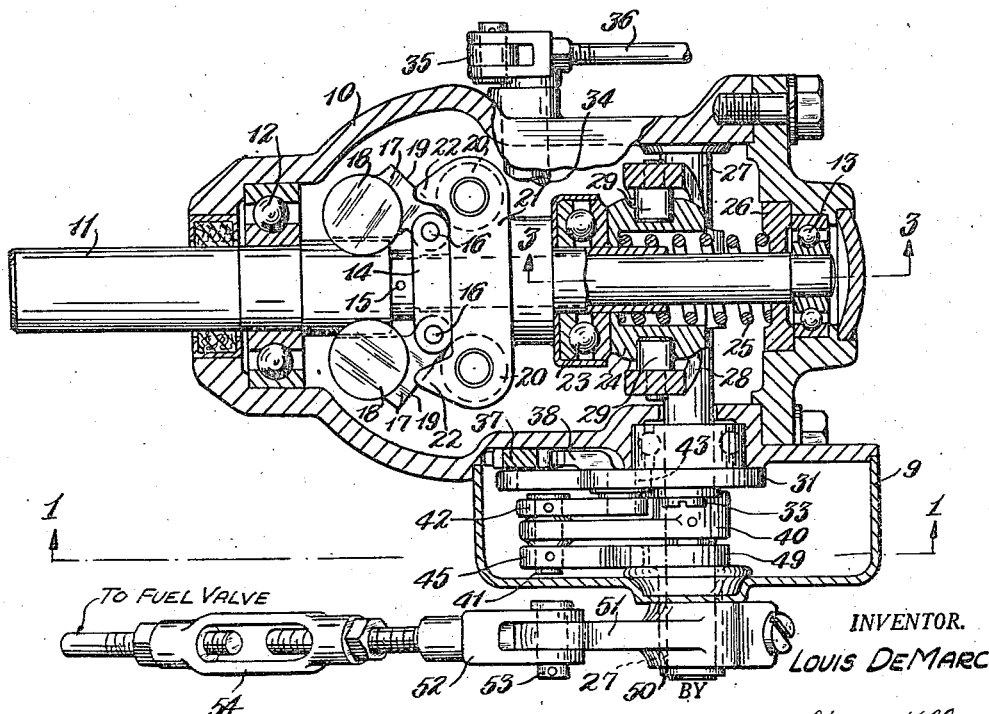
Fig. 2 is a horizontal sectional view, partly on the line 2—2 of Fig. 1.

The means illustrated in Figs. 1 and 2 for manually setting cam 31 in any selected position consists of a transverse rock shaft 34 having a crank 35 to which is attached a link 36 that may extend to any location convenient for operation. On the opposite end of shaft 34 there may be fixed another crank 37 having an enlarged end working in the cavity of a U-shaped bracket 38 which is secured to, or made integral with, cam 31.

The cam is shown in Fig. 1 at one limit of its motion corresponding to the idle position of the engine. As the link 36 is moved toward the left, crank 37 is swung counterclockwise, and cam 31 clockwise. When moved in this direction to the limit of motion permitted by the slot 32 the cam will be set for the maximum speed of the engine. On the shaft 27 exteriorly of the cam 31 there is pinned an arm 40 which, at its outer extremity, is perforated to oscillatably support the middle part of a short shaft 41. On the inner end of this shaft there is pinned a lever arm 42 at the outer end of which is a roller follower 43 which runs in a cam slot 44 in cam member 31. At the forward end of shaft 41 and on the opposite side of arm 40 there is pinned a second lever arm 45. The arm 42, the shaft 41 and the arm 45 together constitute a bell crank lever, the pivotal point of which moves with the swinging arm 40.

Cam slot 44 comprises two arcuate portions 46 and 47 with different radii, the two arcs preferably, but not necessarily, having a common center at the axis of shaft 27. The arcuate portions 46 and 47 of the cam slot are connected by an eccentric portion 48 which may be relatively steep. In any given running position of the engine, follower 43 stands in this intermediate eccentric portion 48 of the slot as will presently appear.

Lever arm 45 carries an enlargement at its outer extremity which engages between the legs of a U-shaped end portion on a crank 49 that is formed integral with a sleeve 50 which surrounds and is rotatable with respect to shaft 27. Upon sleeve 50 outside the casing 30 there is clamped a crank 51 with an eye at its outer end. A yoke 52 straddles crank 51, the two parts being pivotally connected by means of a pin 53. Yoke 52 constitutes part of a link connection which may include a turnbuckle 54 for adjustment purposes. All of these parts 49, 50, 51, 52, 53 and 54, together are referred to hereinafter as throttle means. They operate a fuel regulator, not shown, in the fuel line of a Diesel engine.

Figure 4:
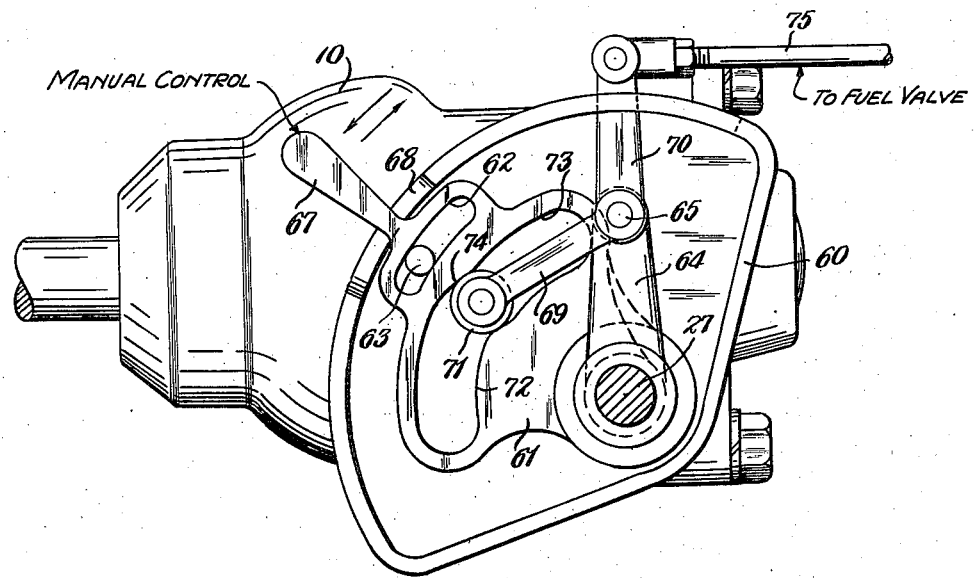
Fig. 4 is a view similar to Fig. 1 showing a form of the invention intended for use primarily upon Diesel engines of the stationary type.

In the Fig. 4 construction the cam 61 is free to turn about the axis of shaft 27 within casing 60, and is adapted to be shifted to any desired position by a handle 67 directly connected to or formed integral with the cam and projecting through a slot 68 in the periphery of the casing. Slot and pin means 62, 63 limits the throw of the cam, and a nut, not shown, may be threaded onto pin 63 for locking the cam in any position of adjustment. 64 is a control arm secured to shaft 27 and corresponds in function to the arm 40 of the first described form of the invention. At its extremity it carries a pivot 65 upon which is mounted a bell crank lever having lever arms 69 and 70. Lever arm 69 carries a roller follower 71 which runs in a cam slot having two arcuate portions 72 and 73 connected by an eccentric portion 74. Lever arm 70 runs through a slot in the perimeter of the casing 60 and has an operating link 75 connected with it, which link extends to or forms part of the throttle mechanism of the engine.

Figure 3:
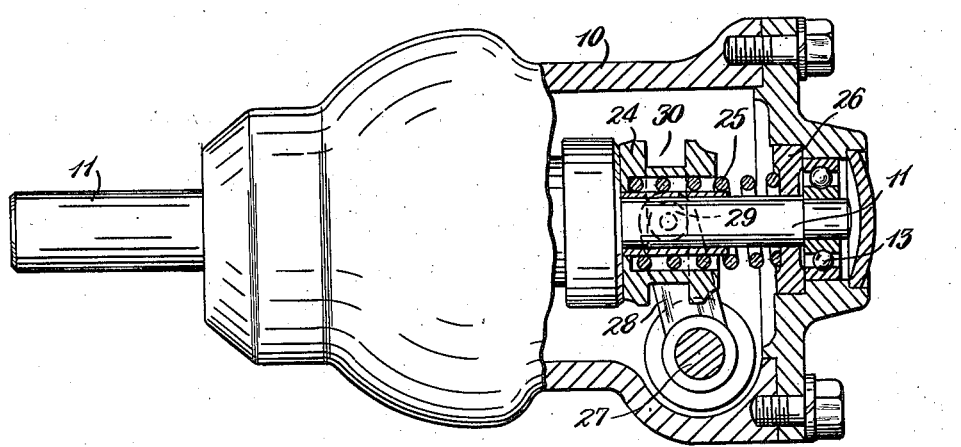
Fig. 3 is a detail sectional view on the line 3—3 of Fig. 2.

*Operation.*—Figs. 1, 2 and 3 show an application of the invention to control mechanism for an internal combustion engine of a type designed for operation at variable speeds. The governor must of course be driven by the engine, and as conventionally constructed it responds uniformly to speed variations throughout its speed range, in other words from its idling speed up to its intended running speed. A governor with a uniform effect throughout its speed range cannot be made sensitive to small variations in the critical speed range, that is at and near the desired running speed, because if it were so made the governor movement over the complete range would be so great as to be prohibitive. In the present invention the response of the control mechanism to speed changes throughout the greater part of the speed range of the engine is relatively small, while in the critical range at and near the running speed of the engine the control mechanism responds to relatively slight speed variations, and thus an accurate control of speed in that range results.

In Diesel engines a rich mixture is required for acceleration, while a somewhat leaner mixture gives optimum results after the engine has attained running speed. My control mechanism as illustrated in Figs. 1, 2 and 3 is designed to automatically accomplish this result. The position of parts in Fig. 1 is for idling speed. In order to accelerate the engine to running speed, the operator moves link 36 gradually to the left, which operates through cranks 35 and 37 to move cam 31 clockwise. The first effect of such movement is to cause follower 43 to run onto the shorter radius arcuate portion 56 of the cam, thereby swinging the bell crank lever 42, 41, 45 clockwise and moving crank 49 counterclockwise. The throttle means 49, 50, 51, 53, 52 and 54 thereby moves to open the fuel regulator somewhat, feeding a rich mixture into the engine, which then accelerates. As the engine speed increases shaft 27 will turn gradually in the clockwise direction, carrying along with it control arm 40, and because of the interconnection between lower arm 45 and crank 49 this will impart a clockwise movement to sleeve 50 which will transmit motion to the throttle means, gradually reducing the opening of the fuel valve. As soon as the engine reaches the speed for which the cam 31 is set by the operator the follower 43 will again ride into the eccentric part 48 of the cam, when the bell crank 42, 41, 45 will turn counterclockwise, thereby giving a rapid clockwise movement to sleeve 50 and reducing the richness of the mixture to the valve needed for running at the speed called for by the particular cam setting.

Now, should the load be increased, tending to reduce engine speed, shaft 27 will turn counterclockwise, moving pivot 41 downward and to the left and drawing follower 43 into the portion 46 of the cam. This will quickly turn crank 49 counterclockwise, opening the fuel valve to enrich the mixture and thereby increase the speed until the follower 43 again moves into the eccentric part of the cam and the speed is brought back to that for which the cam is set. On the other hand if the load upon the engine is decreased the engine will tend to speed up and the shaft 27 will turn clockwise, causing control arm 40 to move follower 43 into the longer radius arc 47 of the cam, which will turn bell crank 42, 41, 45 counterclockwise and transmit clockwise movement to crank 49, whereby the fuel valve will be moved toward closed position an amount sufficient to reduce engine speed to the point where the arm 40 will again return the follower 43 to the eccentric part of the cam, resulting in a return to the speed for which the cam 31 is set.

While I have shown the arcuate portions 46 and 47 of the cam as centered upon the axis of shaft 27, so that the rate of rise of those portions of the cam is zero, it will be appreciated that those portions need not necessarily be arcs of circles, and if they are arcs of circles they need not necessarily be centered upon the same axis or upon the axis of shaft 27. The object of the cam and follower construction is to modify the effect of the governor action upon the throttle means, and to vary this modification to suit different conditions is within the purview of the invention.

The form of the invention illustrated in Fig. 4 is intended for use upon internal combustion engines or other engines, particularly stationary engines which are operated ordinarily at a predetermined running speed. The cam 61 is set at a desired speed by manipulation of handle 67, and may be locked in that position if desired. As illustrated the said setting is for an intermediate speed, and the control mechanism is shown in the running position for that speed. Now, in case the operator desires to decelerate to idling speed, he will grasp handle 67 and swing cam 61 counterclockwise as far as the pin and slot connection 63, 62 will permit. The idling speed will then become the critical speed for which the control is set. The first effect of this cam movement will be to cause follower 71 to run into the portion 73 of the cam, which will swing bell crank lever 69, 70 counterclockwise through a small angle, and this will immediately pull the link 75 to the left and reduce the quantity of mixture fed to the engine. The engine will of course respond and decrease its speed. Control arm 64, fastened to shaft 27 of the governor, will turn with that shaft in the counterclockwise direction, and if the cam portion 73 is on a circular arc with its center in the axis of shaft 27, the bell crank 69, 70 will be maintained in a given relation to arm 64 as the latter swings. When the follower 71 reaches the eccentric part 74 of the cam, bell crank lever 69, 70 will swing rapidly clockwise, increasing the quantity of mixture sufficiently to stop engine deceleration. Now any slight tendency to increase or decrease engine speed will cause the follower to travel up or down the steep portion 74 of the cam slot and will give sensitive and rapid operation of the throttle mechanism to maintain the proper idling speed and avoid unintentional stopping of the engine.

If, on the other hand, the operator desires to increase engine speed from the intermediate speed position of Fig. 4, say to maximum speed, he will swing cam 61 as far as possible clockwise. The first effect will be to cause follower 71 to travel into the arcuate portion 72 of the slot, thereby tilting bell crank lever 69, 70 clockwise to suddenly feed a small additional quantity of mixture to the engine. The engine speed will then increase and the shaft 27 will turn clockwise. The clockwise movement of arm 64 resulting from increasing engine speed will draw follower 71 clockwise until it again reaches the eccentric part 74 of the cam, when the bell crank will rapidly swing counterclockwise reducing the quantity of mixture flowing to the engine, and stopping acceleration.

Now if the load increases the engine speed will be reduced correspondingly, swinging arm 64 counterclockwise and causing follower 71 to travel up the steep part 74 of the cam slot, thereby swinging the bell crank 69, 70 clockwise and feeding additional mixture to the engine in order that the desired speed may be maintained. Similarly, if the load decreases the engine speed will increase, swinging the arm 64 clockwise and causing the follower to ride down the steep part of the cam, thereby decreasing the flow of mixture to the engine and bringing its speed back to that for which the cam 61 is set.

Referring now to Figs. 5 to 9 inclusive in which still another modification of the invention is illustrated, the governor shaft which oscillates through a small angle in response to changes in engine speed is indicated at 27, as in the first described forms of the invention. This shaft has pinned thereto a crank arm 80 corresponding to the arms 40 and 64. A lever 81 is mounted on pivot 82 carried by the crank arm 80. Lever 81 corresponds with the bell crank levers 42, 41, 45 and 69, 70 of the previously described forms of the invention. Means is provided for swinging the upper or power end of this lever manually. In the illustrated case the lever is provided with a slot which receives a pin 83 on the end of a crank 84 that is pinned to a shaft 85 which may be oscillated by the operator. The lower or load end of the lever may carry a pin 86 that runs in a slot 87 formed in a crank 88 carried by sleeve 89 that turns freely on the shaft 27. This sleeve constitutes a throttle control element, and may be connected by any suitable means with the throttle valve or fuel valve.

It will be noted that in this form of the invention the operator swings the lever 81 directly instead of by setting a cam such as 31 or 61 of the other forms. The connections are such however that a relatively small change in engine speed, resulting in relatively small movement of crank arm 80, will produce a relatively great movement of throttle control element 89, especially when the crank 80 and lever 81 are parallel, as they are in Figs. 6 and 8, for then the pin 83 is the fulcrum for the lever and its pin 86 works through a short lever arm on crank 88.

Figure 5:
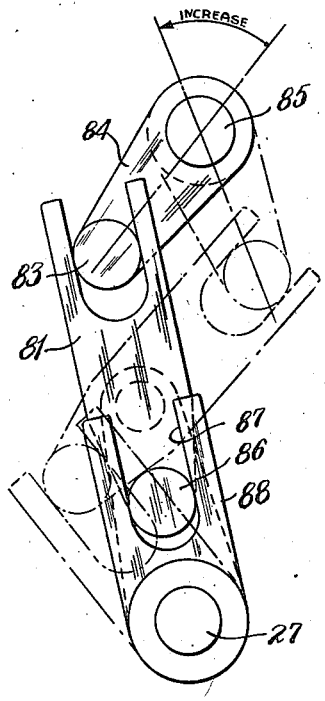
Figures 6, 7:
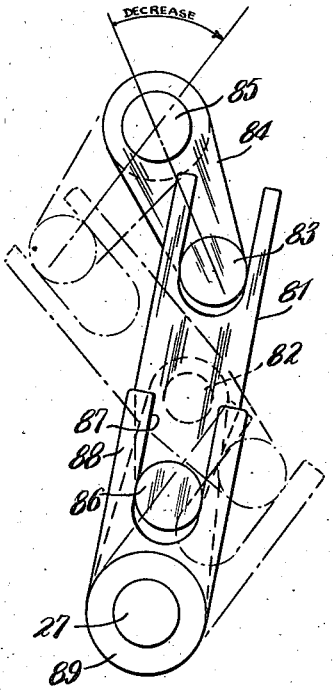
Figure 8:
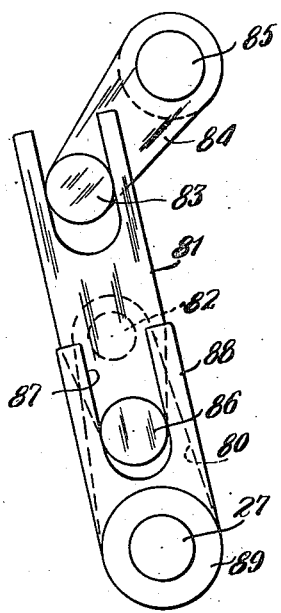

In Fig. 5 the full line position of the parts is the idling position. The dotted line position shows the parts as set by the operator when he desires to accelerate to full engine speed. The resulting movement of the fuel valve which is articulated with sleeve 89 provides a rich mixture. The engine accelerates, causing crank arm 80 to swing clockwise, whereby the pivot 82 moves clockwise about shaft 27, swinging the pin 86 toward the right and reducing the size of the fuel opening as the speed increases. The full throttle condition after full speed is attained is illustrated in Fig. 6. While as indicated in the drawings the fuel valve is open wider at high speed than at idling, this of course means merely that more fuel enters the cylinders per stroke at idling than at high speed, which is desirable in Diesel engine operation.

In Fig. 7 the full lines show the high speed position of the mechanism, while the broken lines show the position to which the parts are shifted in order to call for idling speed. In this case the crank 88 on the sleeve 89 is thrown to the right, cutting off fuel supply. As the engine speed decreases the crank arm 80 swings counterclockwise and turns lever 81 clockwise on its pivot 82, thereby swinging crank 88 back counterclockwise into the position of Fig. 8.

Assuming that the mechanism is in the condition illustrated in Fig. 6, which is its running condition at high speed, and that there is a sudden increase in the load imposed upon the engine, in that event the engine speed will tend to decrease and the crank arm 80 will swing somewhat counterclockwise, thereby swinging lever 81 clockwise around the pin 83 as a fulcrum and turning sleeve 89 counterclockwise, thereby opening the fuel valve somewhat wider to maintain the desired speed in spite of the increased load. Reducing the load on the engine has the opposite effect, that is the engine speed tends to increase, the crank arm 80 swings clockwise, the lever 81 turns counterclockwise and sleeve 89 turns clockwise reducing the fuel valve opening and holding down the speed of the engine to that for which the arm 84 is set.

When an internal combustion engine is made subject to control by a governor it is common to employ two butterfly valves, one manually operated and one governor operated. The manual valve is used for starting, stopping, accelerating and decelerating the engine, and the governor valve for limiting the speed. It will be observed that in accordance with the present invention however the same result is attained by means of a single butterfly or throttle, for the control cam may be set either at idling or at any desired speed, the governor functioning to move the single butterfly or throttle to the necessary extent to attain and hold that speed.

Having thus described my invention, I claim:

1. In engine control mechanism, a control member movable in a predetermined path only, a bell crank lever pivoted to said control member, a throttle operating element articulated with one arm of said bell crank lever, the other arm thereof carrying a follower, and cam means engaged by said follower, whereby the effect upon said throttle operating element of a given movement of said control member may be modified by cam contour.

2. Engine control mechanism according to claim 1, wherein said control member is an arm swinging about a fixed axis.

3. Engine control mechanism according to claim 1, wherein said control member is an arm swinging about a fixed axis, and said cam means is adjustable about the same axis.

4. In engine control mechanism, a governor adapted to be driven by the engine, a control member movable in response to changes in governor speed, a bell crank lever pivoted to said member, a throttle operating element articulated with one arm of said bell crank lever, the other arm thereof carrying a follower, and cam means engaged by said follower for maintaining a given relation between said bell crank and said control member while the latter moves in one direction toward a predetermined critical engine speed setting and for swinging said bell crank on said member in response to small speed variations in the neighborhood of said critical speed.

5. In engine control mechanism, a governor adapted to be driven by the engine, a rock shaft arranged to turn in response to changes in governor speed, a control arm fixed upon said shaft, a bell crank lever pivoted to said control arm, a throttle operating element articulated with one arm of said bell crank lever, the other arm thereof carrying a follower, and cam means engaged by said follower for maintaining a given relation between said bell crank and said control arm while the latter moves in one direction toward a predetermined critical engine speed setting and for swinging said bell crank on said control arm in response to small speed variations in the neighborhood of said critical speed.

6. In engine control mechanism, throttle means, a manually operated cam settable for different engine speeds, a governor adapted to be driven by said engine, control means responsive to said cam when advanced to a higher speed setting for initially manipulating said throttle means, said control means being responsive also to said governor acting through said cam for continuing said throttle manipulation regularly until the engine attains the speed for which said cam is set, and then functioning rapidly in either direction to oppose small speed fluctuations and hold the engine speed substantially constant.

7. In combination, throttle means for an internal combustion engine, a cam settable for a selected engine speed, said cam having a uniform rate of rise portion and a rapid rate of rise portion at one end of said uniform portion, a governor adapted to be operatively connected with said engine, control means actuated by said governor comprising a follower for said cam adapted to actuate said throttle means at a uniform rate while the follower runs on said uniform cam portion and to actuate said throttle means more rapidly when the follower reaches said rapid rate of rise portion of the cam, whereby said throttle means is sensitive to small speed fluctuations in the neighborhood of said selected speed.

8. In combination, throttle means for an internal combustion engine, a cam settable for a selected engine speed, said cam having two portions, each with a uniform rate of rise, said uniform portions being connected by a rapid rate of rise portion, a governor adapted to be operatively connected with said engine, means actuated by said governor comprising a follower for said cam adapted to actuate said throttle means at a uniform rate while the follower runs on either of said uniform cam portions toward the said rapid rate of rise portion and to actuate said throttle means more rapidly when the follower reaches said rapid rate of rise portion, whereby said throttle means is sensitive to small speed variations in either direction from said selected speed.

9. In combination, throttle means for an internal combustion engine, a cam settable for a selected engine speed having two circular arcs of different radii with a common center and connected by an eccentic portion, a governor adapted to be operatively connected with said engine, means actuated by said governor comprising a follower for said cam adapted to actuate said throttle means at a uniform rate while the follower runs in one of said circular arc portions and to actuate said throttle means more rapidly when the follower reaches said eccentric portion of the cam, whereby the control of said throttle means is sensitive to small speed fluctuations in the vicinity only of said selected speed.

10. In speed control mechanism for an internal combustion engine, a governor adapted to be operatively connected with said engine, a shaft oscillatable in response to speed changes in said governor, a cam pivoted about the axis of said shaft and settable for a selected engine speed, said cam having an arcuate portion centered at said axis and an eccentric portion at one end of said arcuate portion, an arm secured to said shaft, a lever pivoted on said arm having a follower running on said cam, and throttle means operatively connected with said lever.

11. Speed control mechanism according to claim 10, wherein said throttle means comprises an element oscillatable about said axis.

12. In speed control mechanism for an internal combustion engine, a governor adapted to be operatively connected with said engine, a shaft oscillatable in response to speed changes in said governor, a cam pivoted about the axis of said shaft and settable for a selected engine speed, said cam having two arcuate portions of different radii both centered at said axis, said arcuate portions being connected together by an eccentric portion, an arm secured to said shaft, a lever pivoted on said arm having a follower running on said cam, and throttle means operatively connected with said lever.

13. In speed control mechanism for an internal combustion engine, a governor adapted to be operatively connected with said engine, a shaft oscillatable in response to speed changes in said governor, a cam pivoted about the axis of said shaft and settable for a selected engine speed, said cam having two arcuate portions of different radii both centered at said axis, said arcuate portions being connected together by an eccentric portion, an arm secured to said shaft, a bell crank lever pivoted at an intermediate point to said arm, one end of said lever having a follower running on said cam, and throttle means operatively connected with the opposite end of said bell crank lever.

14. Speed control mechanism according to claim 13, wherein said throttle means comprises an element oscillatable about said axis.

15. In speed control mechanism for an internal combustion engine, a governor adapted to be operatively connected with said engine, a shaft oscillatable in response to speed changes of said governor, a cam pivoted about the axis of said shaft and settable for a selected engine speed, said cam having an intermediate eccentric portion connecting two arcuate portions of different radii, control means responsive to governor action comprising a follower running on one of said arcuate portions of the cam when the latter is set for a higher speed and on the other arcuate portion when the cam is set for a lower speed and engaging said eccentric portion in the critical speed area, and throttle means operatively connected with said control means, whereby the throttle means is more sensitive to speed fluctuations in the critical area than elsewhere.

LOUIS DE MARCO.

REFERENCES CITED

The following references are of record in the file of this patent:

UNITED STATES PATENTS

| Number | Name | Date |
| --- | --- | --- |
| 1,012,611 | Davis | Dec. 26, 1911 |
| 1,032,434 | Seaman | July 16, 1912 |
| 2,270,100 | Adler | Jan. 13, 1942 |